(12) United States Patent
Danielson et al.

(10) Patent No.: US 10,914,413 B2
(45) Date of Patent: Feb. 9, 2021

(54) QUICK CONNECT FLUID CONNECTOR WITH TEMPERATURE SENSING

(71) Applicant: FASTEST, INC., Roseville, MN (US)

(72) Inventors: Robert Danielson, Roseville, MN (US); Chris Wagner, Roseville, MN (US)

(73) Assignee: FasTest, Inc., Roseville, MN (US)

( * ) Notice: Subject to any disclaimer, the term of this patent is extended or adjusted under 35 U.S.C. 154(b) by 363 days.

(21) Appl. No.: 15/883,314

(22) Filed: Jan. 30, 2018

(65) Prior Publication Data

US 2018/0216765 A1    Aug. 2, 2018

Related U.S. Application Data

(60) Provisional application No. 62/452,048, filed on Jan. 30, 2017.

(51) Int. Cl.
| | |
|---|---|
| *F16L 41/08* | (2006.01) |
| *F16L 35/00* | (2006.01) |
| *G01K 1/16* | (2006.01) |
| *F16L 37/12* | (2006.01) |
| *F16L 37/44* | (2006.01) |
| *G01K 13/02* | (2006.01) |

(Continued)

(52) U.S. Cl.
CPC ........... *F16L 35/00* (2013.01); *F16L 37/1215* (2013.01); *F16L 37/138* (2013.01); *F16L 37/18* (2013.01); *F16L 37/44* (2013.01); *F16L 41/008* (2013.01); *F16L 53/34* (2018.01); *G01K 1/16* (2013.01); *G01K 5/28* (2013.01); *G01K 5/44* (2013.01); *G01K 7/026* (2013.01); *G01K 13/02* (2013.01); *G01K 2013/024* (2013.01)

(58) Field of Classification Search
CPC ......... F16L 41/08; F16L 37/18; F17C 13/026; F17C 2250/0615
USPC ......................................................... 285/93
See application file for complete search history.

(56) References Cited

U.S. PATENT DOCUMENTS

| | | | |
|---|---|---|---|
| 4,921,284 A | 5/1990 | Singeetham | |
| 5,343,798 A | 9/1994 | Meisinger et al. | |
| (Continued) | | | |

FOREIGN PATENT DOCUMENTS

| | | |
|---|---|---|
| CN | 102735278 | 10/2012 |
| CN | 104160194 | 11/2014 |
| CN | 205877527 | 1/2017 |

OTHER PUBLICATIONS

Chinese Office Action, issued in the corresponding Chinese patent application No. 201810087941.1, dated Oct. 30, 2020, 13 pages (including translation).

*Primary Examiner* — David Bochna
(74) *Attorney, Agent, or Firm* — Hamre, Schumann, Mueller & Larson, P.C.

(57) ABSTRACT

A quick connect fluid connector that is detachably connectable to a fluid system to process a gas into or from the fluid system through the quick connect fluid connector. The quick connect fluid connector includes one or more temperature sensors that can sense the temperature of the gas within the fluid connector during processing. Based on the sensed temperature(s), an alert can be generated to alert a human operator conducting the processing and/or automatically shut-off the processing if the sensed temperature becomes too high. The operator will therefore be alerted if the cylinders are being processed too quickly or if the processing duration could be shortened.

11 Claims, 7 Drawing Sheets

(51) Int. Cl.
*F16L 37/18* (2006.01)
*F16L 53/34* (2018.01)
*F16L 37/138* (2006.01)
*F16L 41/00* (2006.01)
*G01K 5/28* (2006.01)
*G01K 5/44* (2006.01)
*G01K 7/02* (2006.01)

(56) References Cited

U.S. PATENT DOCUMENTS

| | | |
|---|---|---|
| 5,507,537 A | 4/1996 | Meisinger et al. |
| 5,575,510 A | 11/1996 | Weh et al. |
| 5,829,880 A * | 11/1998 | Diedrich ............... G01K 13/02 |
| | | 374/208 |
| 6,341,619 B1 | 1/2002 | Beninga |
| 6,649,829 B2 | 11/2003 | Garber et al. |
| 6,897,374 B2 | 5/2005 | Garber et al. |
| 7,647,954 B2 | 1/2010 | Garber et al. |
| 8,844,979 B2 | 9/2014 | Danielson |
| 2004/0140666 A1* | 7/2004 | Lin ........................ F17D 5/06 |
| | | 285/93 |
| 2010/0201118 A1* | 8/2010 | Anton .................. F16L 19/086 |
| | | 285/93 |
| 2010/0276923 A1* | 11/2010 | Deng .................... F16K 5/0414 |
| | | 285/93 |
| 2011/0148096 A1* | 6/2011 | Engle ...................... G01K 1/14 |
| | | 285/93 |
| 2014/0130799 A1* | 5/2014 | Stenzler ................ F17C 13/04 |
| | | 128/203.14 |
| 2015/0137506 A1* | 5/2015 | Croguenec ........... F16L 27/103 |
| | | 285/93 |
| 2017/0037991 A1* | 2/2017 | Danielson ............ F16L 29/002 |
| 2017/0328799 A1* | 11/2017 | Stilwell ................ G01L 9/0051 |
| 2019/0376649 A1* | 12/2019 | Perez De Alejo ...... F17C 13/04 |

\* cited by examiner

QUICK CONNECT FLUID CONNECTOR WITH TEMPERATURE SENSING

FIELD

This disclosure relates to a quick connect fluid connector that can be used to, for example, connect a first fluid system with a second fluid system for transferring gases between the first and second fluid systems. The quick connect fluid connector includes one or more temperature sensors that can sense the temperature of the gas within the fluid connector to indicate a possible dangerous filling or evacuation condition.

BACKGROUND

Quick connect fluid connectors are often used to connect a first fluid system to a second fluid system to fill or evacuate the second fluid system. The working fluid to be filled or evacuated is typically a gas. The second fluid system can be a gas cylinder, and the first fluid system can be a gas supply line in the case of a gas fill operation or a gas storage device in the case of a gas evacuation operation.

Processing a gas cylinder using a quick connect fluid connector has many limitations when using oxidizing gases like oxygen. One of the limitations occurs because of adiabatic compression of the gas and the associated temperature rise of the gas. If the operator fills the cylinder too rapidly or if the moving fluid is suddenly stopped, adiabatic compression and potentially dangerous temperature rises in the working fluid, both in the fluid connector and in the gas cylinder, can occur.

Depending on the pressure and volume of the gas in motion, it is possible to achieve such a large amount of adiabatic compression that the corresponding temperature increase could ignite materials or contaminants in the fluid connector that are in contact with the fluid stream, like an o-ring seal or general grime. The temperature rise is especially problematic in fluid connectors that utilize non-metal seals like rubber o-rings because the temperature could reach the auto-ignition temperature of the rubber material. Accordingly, there are limitations in how quickly gas cylinders can be filled using quick connector fluid connectors as some gas cylinders are filled slower than the maximum permissible speed due to the operators exercising caution and the operator not knowing if a hazard is being created during the filling process due to the filling speed.

SUMMARY

A quick connect fluid connector is described that is detachably connectable to a fluid system to process a gas into or from the fluid system through the quick connect fluid connector. The quick connect fluid connector includes one or more temperature sensors that can sense the temperature of the gas within the fluid connector during processing. Based on the sensed temperature(s), an alert can be generated to alert a human operator conducting the processing and/or automatically shut-off the processing if the sensed temperature becomes too high. The operator will therefore be alerted if a gas cylinder is being processed too quickly or if the processing duration could be shortened. Accordingly, gas cylinder processing can be performed more quickly and safely compared to conventional quick connect fluid connectors without temperature sensing.

The temperature sensor(s) can be located at many locations within the fluid connector. In one embodiment, the temperature sensor(s) is at a location in the fluid connector where adiabatic compression of the gas during processing is likely to cause a temperature rise of the gas. One temperature sensor can be used, or multiple temperature sensors can be used at different locations in the fluid connector.

The temperature sensor(s) is preferably positioned so as to be in intimate contact with the gas during processing. A sheath made from a material that is compatible with the gas being processed protects the temperature sensor and prevents contamination of the processed gas.

In one embodiment, a quick connect fluid connector that is detachably connectable to a fluid system to process a gas into or from the fluid system through the quick connect fluid connector includes a connection mechanism having a connected position to detachably connect the quick connect fluid connector to the fluid system and disconnected position to disconnect the quick connect fluid connector from the fluid system. An actuator is connected to the connection mechanism to actuate the connection mechanism between the disconnected position and the connected position. A gas flow path is formed through the quick connect fluid connector for gas to flow through while the gas is processed into or from the fluid system. In addition, a temperature sensor is disposed in the gas flow path so that during use of the quick connect fluid connector when connected to the fluid system and processing gas into or from the fluid system, the temperature sensor is in intimate contact with gas in the gas flow path to sense the temperature of the gas. The temperature sensor includes a temperature sensing element or mechanism and a sheath that separates the temperature sensing element from the gas in the gas flow path.

In another embodiment, a method of processing a gas into or from a fluid system through a quick connect fluid connector includes connecting the quick connect fluid connector to the fluid system to process the gas into or from the fluid system through a gas flow path of the quick connect fluid connector. While the gas is being processed into or from the fluid system through the quick connect fluid connector, the temperature of the gas is sensed using a temperature sensor in the gas flow path that is in intimate contact with the gas.

DRAWINGS

Figure 5:
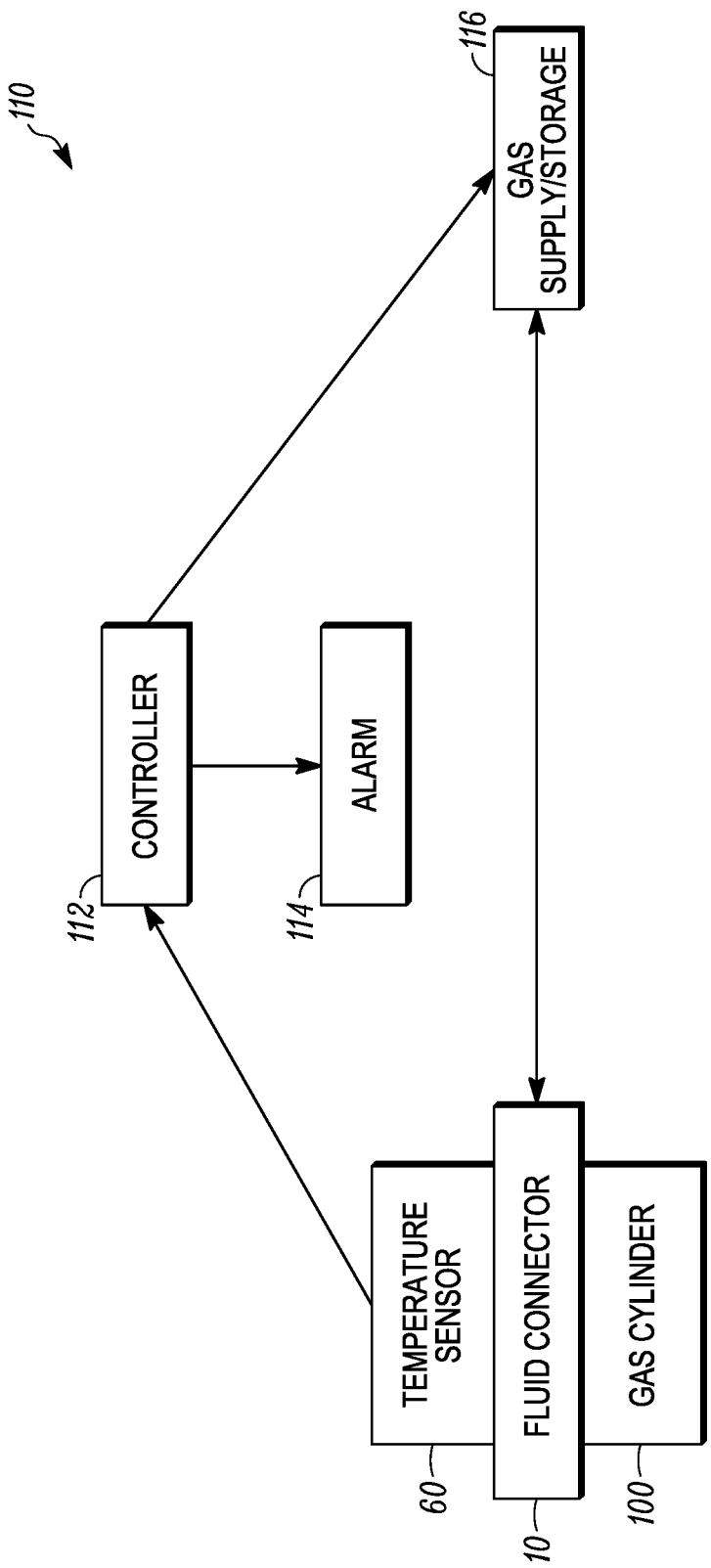

FIG. 5 schematically illustrates an example of a smart control system that can be implemented using the temperature sensing described herein.

Figure 6:
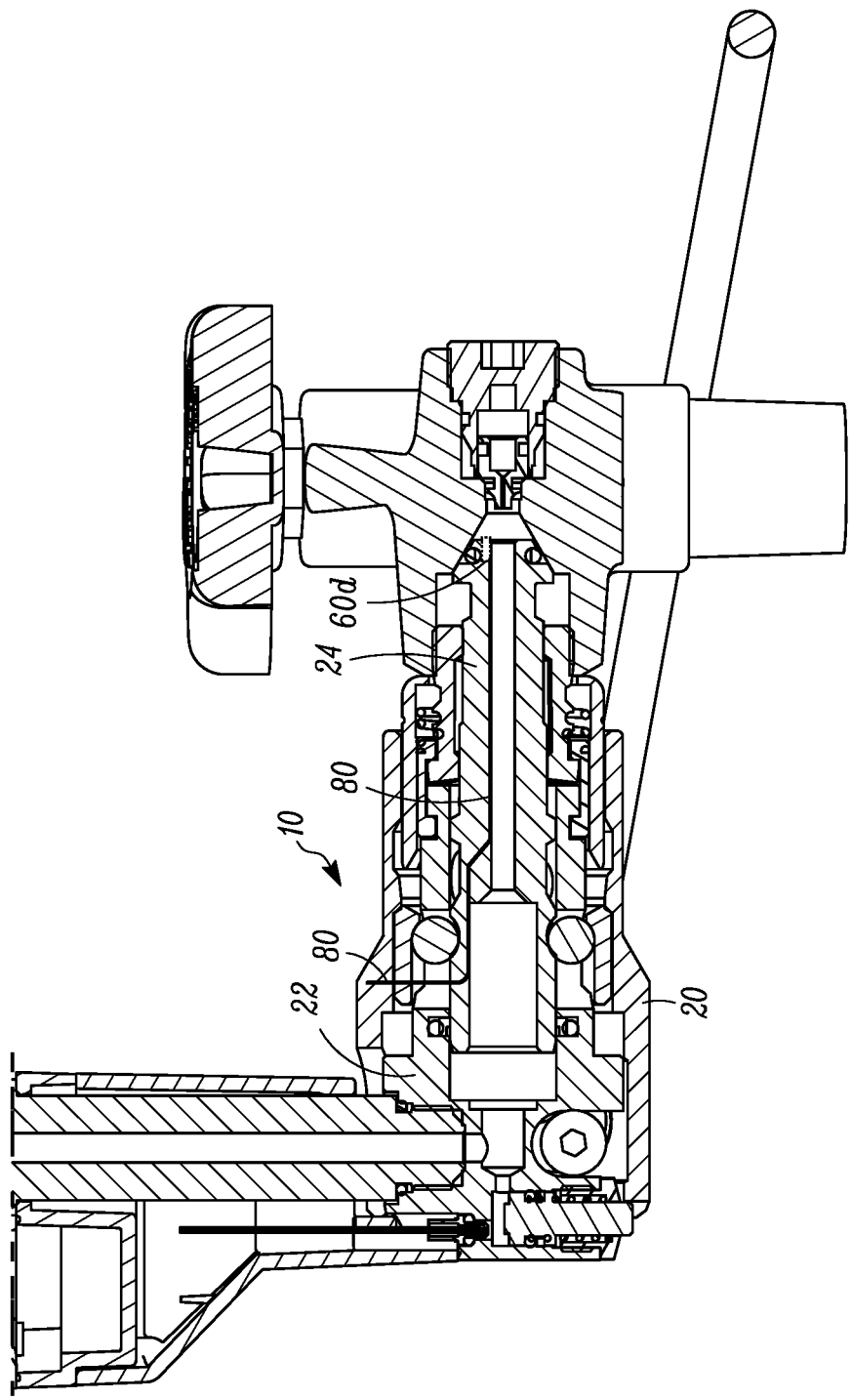

FIG. 6 is a longitudinal cross-sectional view of another embodiment of a quick connect fluid connector described herein with a temperature sensor at an end of the piston.

Figure 3:
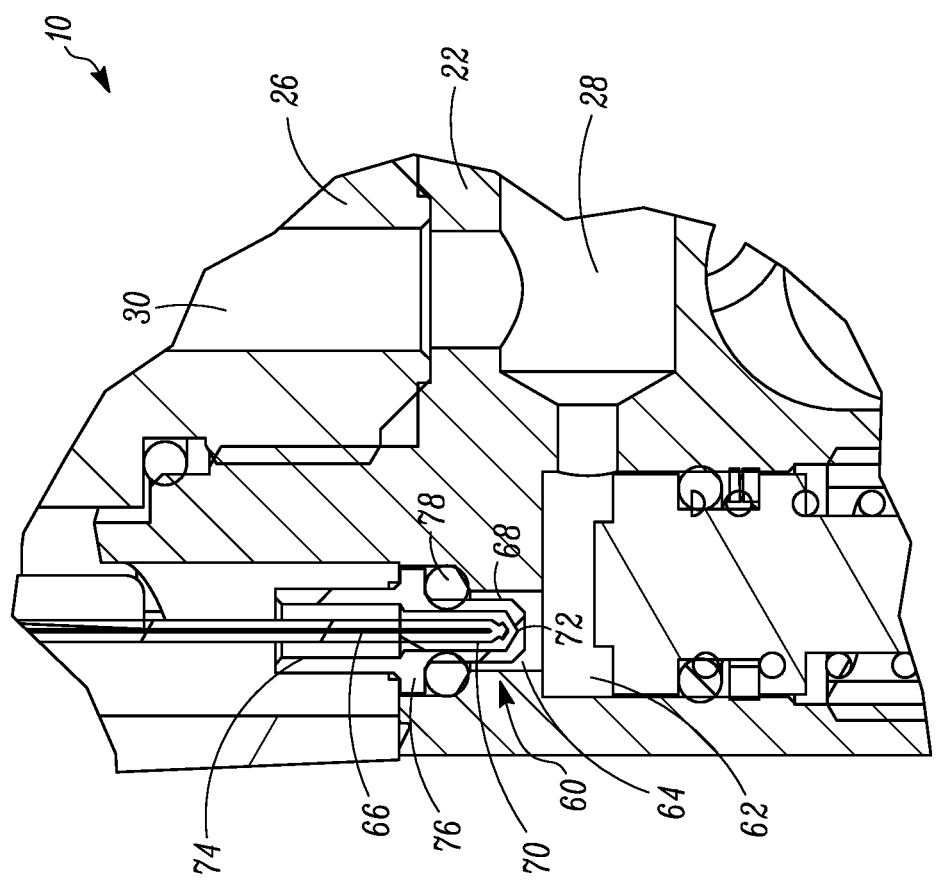
FIG. 3 is a detailed close-up view of the portion contained within the circle 3 in FIG. 2.
Figure 7:
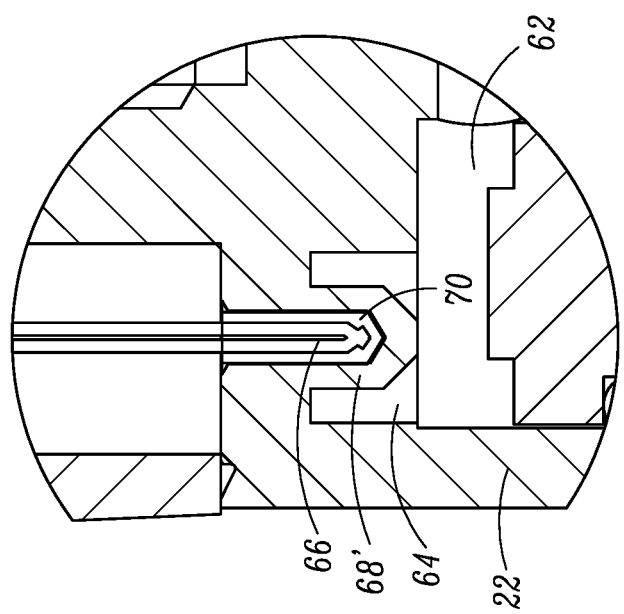

FIG. 7 is a detailed close-up view similar to FIG. 3 but showing another embodiment of a temperature sensor.

DETAILED DESCRIPTION

A quick connect fluid connector described herein acts as the mechanical and fluid connection between a filling line and a gas cylinder where the quick connect fluid connector can be used in processing operations such as gas filling and/or evacuation of the gas cylinder. The quick connect fluid connector includes one or more temperature sensors that can sense the temperature of the gas within the fluid connector during processing. For sake of convenience in explaining the concepts described herein, a specific example of a quick connect fluid connector is described and illustrated herein. However, the concepts described herein can be used on any other type of quick connect fluid connector that one may wish to use for gas processing (filling and/or evacuating).

Figure 1:
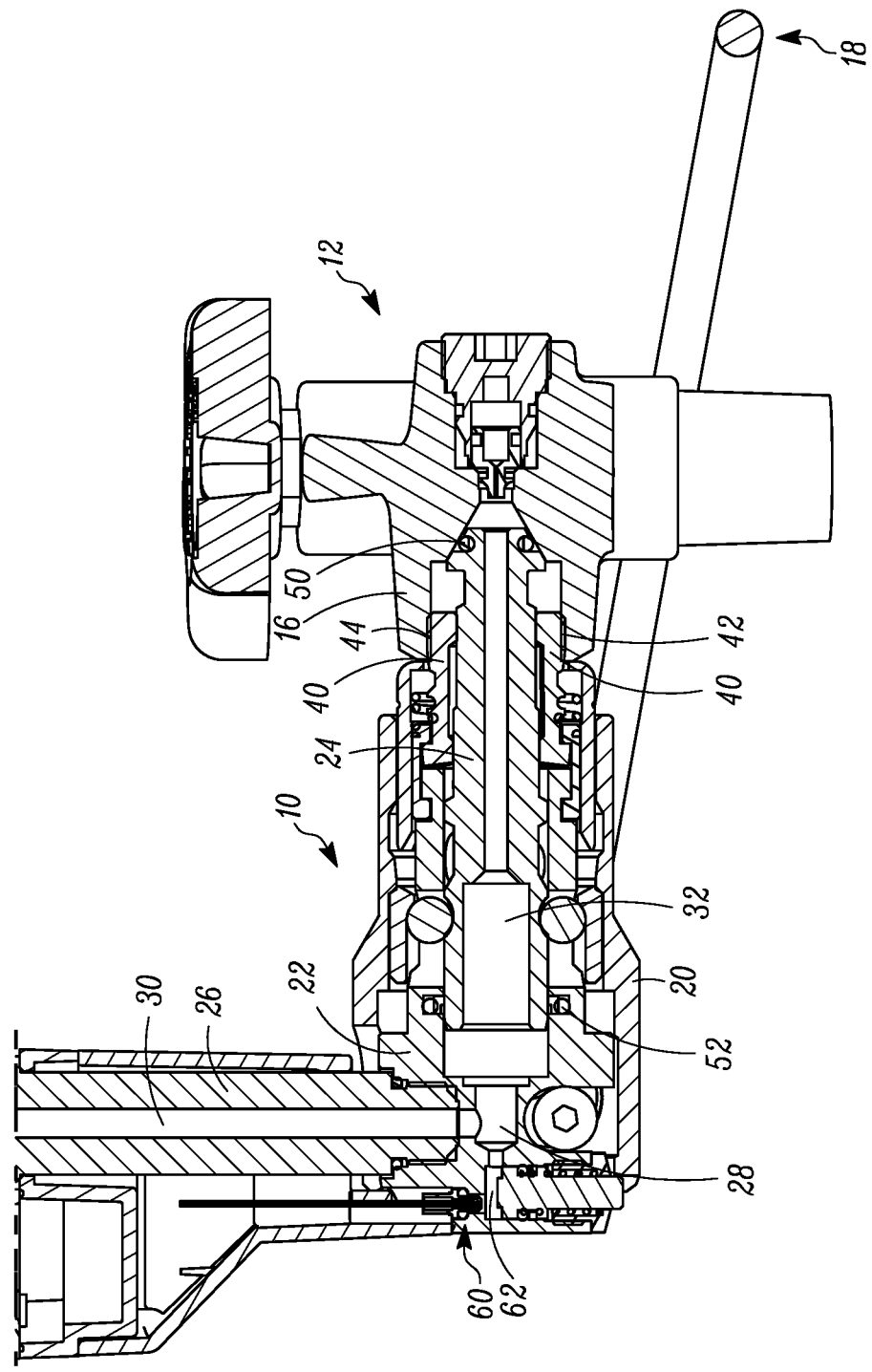
FIG. 1 is a longitudinal cross-sectional view of an example quick connect fluid connector described herein connected to a valve of a gas cylinder.
Figure 2:
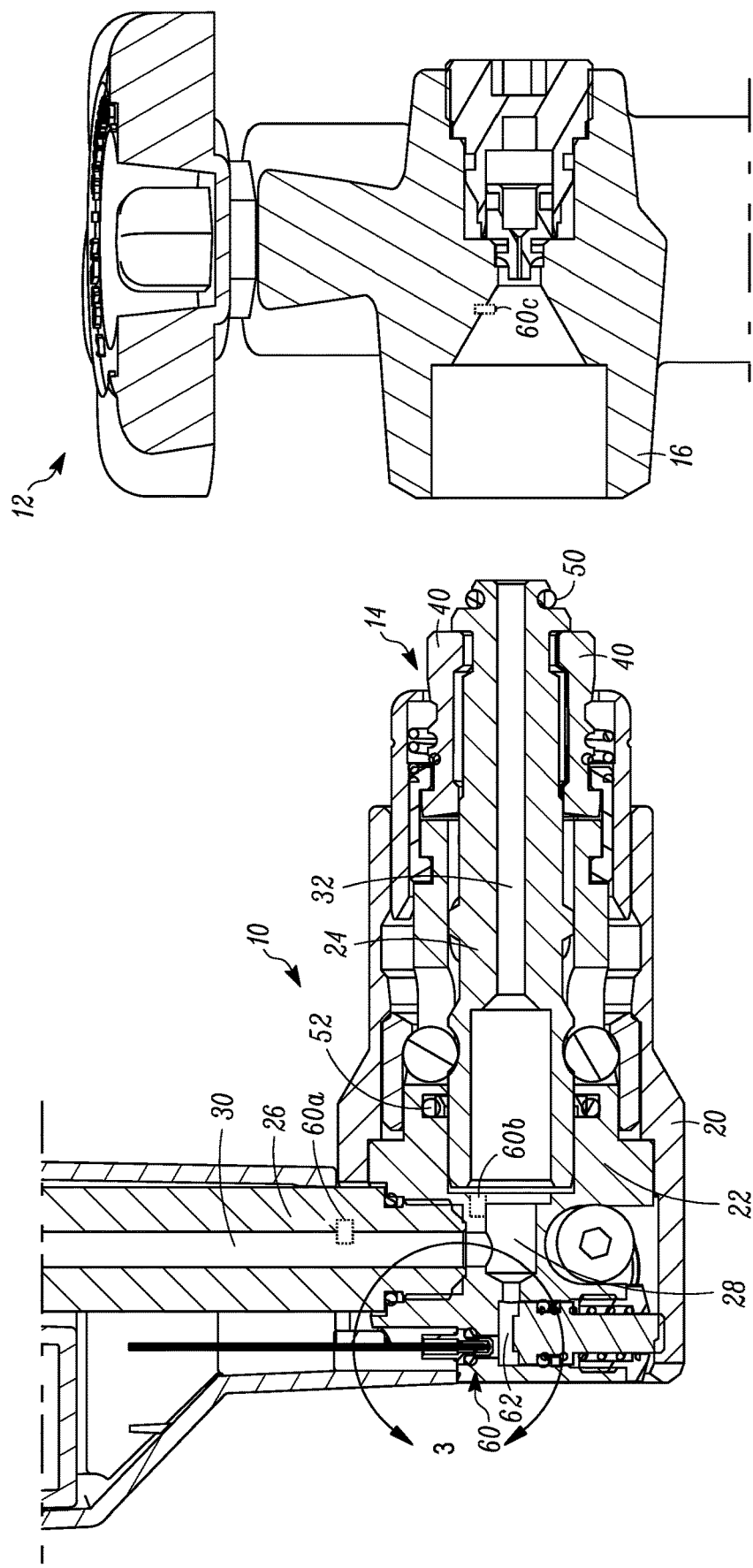
FIG. 2 is a view similar to FIG. 1 but with the example quick connect fluid connector disconnected from the valve.

Referring initially to FIGS. 1 and 2, an example quick connect fluid connector 10 is illustrated along with a cylinder valve 12. The fluid connector 10 is similar in overall construction and operation to quick connect fluid connectors used in the gas filling industry and available from FasTest Inc. of Roseville, Minn. In addition, further information on a similar fluid connector of this type, as well as its operation, can be found in U.S. Pat. No. 8,844,979 which is incorporated herein by reference in its entirety.

The cylinder valve 12 is conventional in construction and is attached to a gas cylinder 100 (shown schematically in FIG. 5) forming a fluid system that is to be filled with a gas including, but not limited to, oxygen, argon, helium, hydrogen, nitrogen, neon, krypton, xenon and other gases and where the fluid connector 10 is used during filling and/or evacuation processing involving the gas. The valve 12 controls the ingress and egress of gas to and from the gas cylinder 100.

The fluid connector 10 has a suitable connection means 14 that can be actuated to achieve a temporary, sealed connection with a port 16 of the cylinder valve 12 through which the gas is introduced into or discharged from the gas cylinder. An interior (or exterior) surface of the port 16 is provided with threads or other conventional structure for engagement by the connection means 14 of the connector 10 to provide mechanical connection between the fluid connector 10 and the valve 12. Examples of suitable connection means 14 include, but are not limited to, externally threaded collets that are engageable with internal threads of the port 16 (as illustrated in the figures herein and described in U.S. Pat. No. 8,844,979), internally threaded collets that are engageable with external threads on the port 16 (as described in U.S. Pat. No. 8,844,979), unthreaded collets, connection means like those described in U.S. Pat. No. 5,507,537, connection means like those described in U.S. Pat. No. 5,343,798, connection means like those described in U.S. Pat. No. 4,921,282, and other types of connection means known in the art. A specific example of a connection means 14 in the form of externally threaded collets will be described in further detail below.

The connection means 14 is actuated by a suitable manual actuation means 18 known in the art to achieve connection and disconnection. In the example illustrated in FIG. 1, the actuation means 18 comprises a handle, for example a bail handle. However, other types of manual actuation means 18 known in the art, such as levers, can be used. In addition, motorized or fluid-actuated actuation mechanisms known in the art can be used.

With continued reference to FIGS. 1 and 2, further details of the fluid connector 10 will be described. The fluid connector 10 generally includes a cylindrical outer sleeve 20 that defines a longitudinal axis, a main body 22, and a piston 24, in addition to the connection means 14 and the actuation means 18 that forms part of an actuator 18 that is connected to the connection mechanism 14 to actuate the connection mechanism 14. Further information on the construction and operation of the sleeve 20, the main body 22, the piston 24, the connection means 14 (both externally threaded collets and internally threaded collets) and the actuation means 18 can be found in U.S. Pat. No. 8,844,979 which is incorporated herein by reference in its entirety.

The main body 22 is a cylindrical member and is disposed at least partially in and surrounded by the sleeve 20. A nipple 26 is fixed to the main body 22 that defines a fluid port and that projects beyond an exterior of the cylindrical sleeve 20. The main body 22 and the sleeve 20 are slideable relative to one another parallel to the longitudinal axis. The main body 22 defines a fluid passageway 28 that is in fluid communication with a fluid passageway 30 of the nipple 26 so that gas can flow between the nipple 26 and the fluid passageway 28.

The piston 24 is a cylindrical member that is disposed at least partially within the main body 22, and the piston 24 is slideable relative to the main body 22 parallel to the longitudinal axis. The piston 24 defines a fluid passageway 32 that extends therethrough from one end to the other and is in fluid communication with the fluid passageway 28 of the main body 22. The fluid passageways 28, 30, 32 define a gas flow path for the gas through the fluid connector 10 during processing. As described in U.S. Pat. No. 8,844,979, a spring (not shown) acts on the piston 24 to bias the piston 24 in a direction toward the right in FIGS. 1 and 2, i.e. toward the valve 12.

The connection mechanism 14 is illustrated as including a plurality of collets 40 that are mounted on the main body 22 and surround the end of the piston 24. The collets 40 are actuatable from a collapsed or disconnected position (shown in FIG. 2) to an expanded or connected position (shown in FIG. 1) connected to the port 16. The exterior surfaces of the collets 40 are formed with exterior threads 42 that grip with internal threads 44 (see FIG. 1) formed on the interior surface of the port 16. This construction and operation of the collets 40 is conventional and would be well understood by persons of ordinary skill in the art.

The actuator 18 actuates the collets 40 from the collapsed or disconnected position to the expanded or connected position shown in FIG. 1. The actuator 18 can be similar in construction and operation to the actuation mechanism described in U.S. Pat. No. 8,844,979.

Referring to FIGS. 1 and 2, the front end of the piston 24 includes a seal 50 that is configured to seal with an internal surface of the port 16 when connected. In addition, a seal 52 is located between an outer surface of the piston 24 and an interior surface of the main body 22.

The fluid connector 10 includes at least one temperature sensor that can sense the temperature of the gas within the fluid connector 10 during processing. The temperature sensor(s) can be located anywhere on the fluid connector 10 so that the temperature sensor(s) is able to sense the temperature of the gas in the fluid connector 10. The temperature sensor(s) can have any construction that allows it to sense the temperature of the gas in the fluid connector 10.

Referring to FIGS. 1 and 2, an example temperature sensor 60 is shown as being in one possible location at the rear of the fluid connector 10. In this example, a fluid channel 62 extends from the fluid passageway 28 toward the rear of the fluid connector 10. The fluid channel 62 forms a dead-end portion of the flow path through the fluid connector 10. The temperature sensor 60 is disposed so as to be in direct fluid communication with the fluid channel 62 and any gas contained therein.

FIG. 3 illustrates details of the temperature sensor 60. A vertical port 64 is formed in the rear end of the main body 22 generally parallel to the nipple 26 and parallel to the fluid passageway 30. The port 64 extends to and is in fluid communication with the fluid channel 62. The sensor 60 can include a temperature sensing element 66, a sheath 68, and a heat transfer compound 70 between the temperature sensing element 66 and the sheath 68.

The temperature sensing element 66 can have any construction suitable for sensing temperature, such as a pair of thermocouple wires or a resistance temperature detector (RTD) element. As described in further detail below, the temperature sensing element 66 can be connected to a controller to interpret signals from the temperature sensing element 66 and thereby measure the temperature of the gas.

The sheath 68 surrounds the temperature sensing element 66 and separates the temperature sensing element 66 from the gas. The sheath 68 is made of a material that is compatible with the gas flowing through the fluid connector 10. Examples of the sheath material can include, but are not limited to, stainless steel and brass. The sheath 68 is a "cup-shaped" device with a closed end 72 disposed in the port 64 and facing the fluid channel 62, an open end 74 through which the temperature sensing element 66 extends, and a circumferential flange 76 between the closed end 72 and the open end 74. The flange 76 engages with a seal 78, such as an elastomeric o-ring seal, disposed within the port 64 to seal between the sheath 68 and the port 64 and prevent escape of gas through the port 64. The sheath 68 can be secured to the main body 22 within the port 64 via any suitable securement means including, but not limited to, an interference fit, adhesive, or threading the sheath 68 into the port 64.

The heat transfer compound 70 fills the space between the interior surface of the sheath 68 and the temperature sensing element 66 to eliminate air gaps and maximize heat transfer between the sheath 68 and the temperature sensing element 66. The heat transfer compound 70 is any material that can quickly and efficiently provide a thermal connection between the sheath 68, which is exposed to the gas, and the temperature sensing element 66 to transfer the heat to the temperature sensing element 66. Examples of the heat transfer compound 70 can include, but are not limited to, metals such as silver, and non-metals such as silicones, resins and epoxies.

In an alternative embodiment illustrated in FIG. 7, the separate sheath 68 is eliminated. Instead, a sheath 68' is integrally formed as part of the main body 22 by a protrusion of the main body 22 that is formed in the port 64 and that extends toward the fluid channel 62. The temperature sensing element 66 and the heat transfer compound 70 are provided in the sheath 68' in a manner similar to that discussed above for FIG. 3. The sheath 68' functions similarly to the sheath 68 by shielding the temperature sensing element 66 from direct engagement with the gas, and transmitting heat from the gas to the temperature sensing element 66 via the heat transfer compound 70. However, by integrally forming the sheath 68' as a part of the main body 22, the need for the seal 78 used in FIG. 3 is eliminated.

Returning to FIGS. 1 and 2, the location of the temperature sensor 60 illustrated in FIGS. 1 and 2 has a number of advantages. For example, the temperature sensor 60 is at a location where adiabatic compression of the gas flowing through the connector 10 occurs. In addition, the temperature sensor 60 is located behind the nipple 26 so it is protected by the nipple 26, and the temperature sensor 60 is located in an area that is relatively easily accessible for installation and servicing.

However, the temperature sensor 60 can be located at other positions on the fluid connector 10 and/or the fluid connector 10 can include additional ones of the same or different temperature sensors. For example, referring to FIG. 2, a temperature sensor 60a can be located on the nipple 26 to sense gas temperature in the fluid passageway 30. In addition, a temperature sensor 60b can be located on the main body 22 in front of the nipple 26 to sense gas temperature in the fluid passageway 28. In addition, a temperature sensor 60c can be located in the port 16 on the valve 12 to sense gas temperature.

In another embodiment illustrated in FIG. 6, a temperature sensor 60d can be located at the front of the fluid connector 10, for example at the front end of the piston 24. One or more wires 80 can extend from the temperature sensor 60d through the piston 24 and from the fluid connector 10 to a controller. The additional temperature sensors 60a, 60b, 60c, 60d, etc. can have constructions that are the same as the temperature sensor 60 in FIGS. 3 and 7 or different than the temperature sensor 60.

The use of two or more temperature sensors 60 provides a number of advantages. For example, it can be determined if there is a gas leak in the fluid connector 10 by measuring the temperature difference between two or three locations in the fluid connector. Two or more temperature sensors 60 also provides redundancy in case of failure of one of the temperature sensors 60. In addition, a control mechanism can be formed that utilizes voting based on the sensor measurements, i.e. with an odd number of temperature sensors measuring the same event, majority wins; if one sensor consistently measures differently, a service alarm could be triggered; etc.

Figure 4:
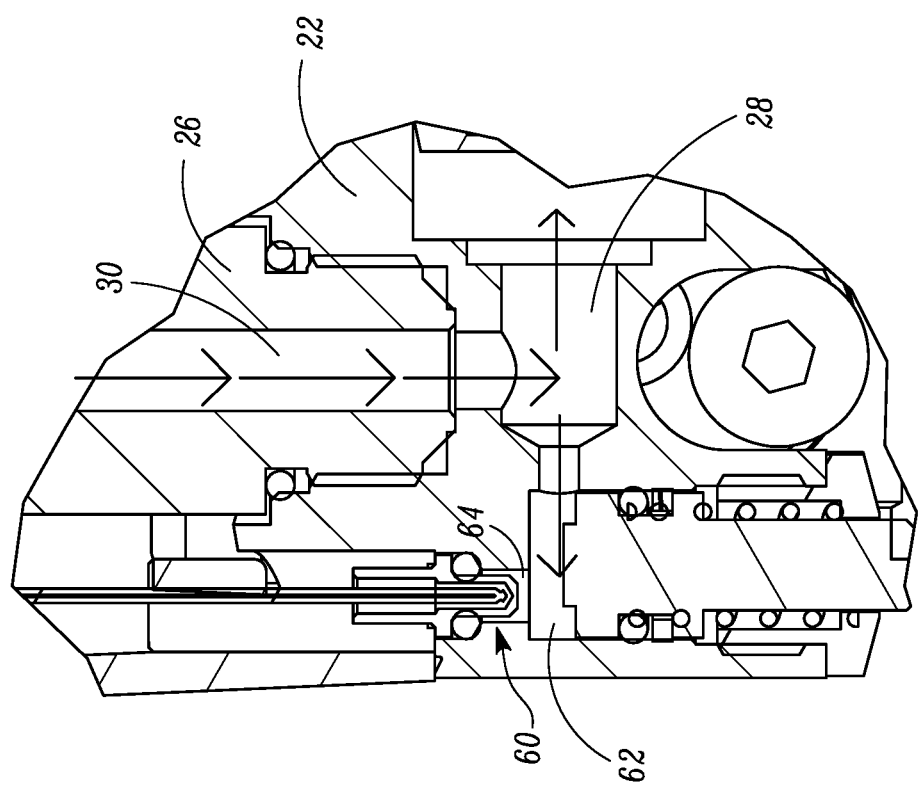
FIG. 4 is a detailed view similar to FIG. 3 showing a gas flow during a gas fill processing operation using the quick connect fluid connector described herein.

FIG. 4 illustrates an example of the gas flow during a gas cylinder filling processing operation using the quick connect fluid connector of FIGS. 1-3 and the temperature sensor 60. The fluid connector 10 is initially connected to the port 16 and the high pressure gas flow is started. The gas flows into the nipple 26 via the fluid passageway 30, then into the fluid passageway 28. Most of the gas will then flow through the fluid passageway 32 of the piston and ultimately into the gas cylinder being filled. Some of the flowing gas enters the fluid channel 62 and dead ends there. When the high pressure gas 'dead ends', compression of the gas will occur. As compression of the gas occurs, the temperature will rise due to fluid compression. The temperature increase will permeate throughout the material mass of the sheath 68 and the temperature sensor 60 will sense the temperature rise. The resulting temperature increase will be sensed and any potentially dangerous rapid temperature rises can be recorded and alerts issued if a dangerous temperature condition is sensed.

FIG. 5 schematically illustrates an example of a smart control system 110 that can be implemented using the fluid connector 10 with the temperature sensing described herein. The fluid connector 10 integrates with the smart control system 110 to provide a suitable indication, such as visual, audible, tactile, or the like, of proper usage of the fluid connector 10 to the operator and/or the temperature measurements can be recorded for later use.

For example, the temperature sensor 60 can be connected to a controller 112 which receives the readings from the temperature sensing element of the temperature sensor 60 and interprets the readings into temperature measurements. The controller 112 can then store the temperature measurement readings in a database for later analysis or review. In addition, the controller 112 can activate a visual and/or audible alarm 114 to indicate a possible dangerous temperature condition in the fluid connector 10. In addition, the controller 112 can be connected to a gas supply or storage 116, and if a dangerous temperature condition is sensed, can automatically slow the flow of gas or automatically terminate the flow of gas from or to the gas supply or storage 116.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A quick connect fluid connector that is detachably connectable to a fluid system to process a gas into or from the fluid system through the quick connect fluid connector, comprising:
   a connection mechanism having a connected position to detachably connect the quick connect fluid connector to the fluid system and a disconnected position to disconnect the quick connect fluid connector from the fluid system;
   an actuator connected to the connection mechanism to actuate the connection mechanism between the disconnected position and the connected position;
   a gas flow path through the quick connect fluid connector for gas to flow through while the gas is processed into or from the fluid system; and
   a temperature sensor disposed in the gas flow path;
   the temperature sensor includes a temperature sensing element and a sheath that separates the temperature sensing element from the gas in the gas flow path, wherein during use of the quick connect fluid connector when connected to the fluid system and processing gas into or from the fluid system, the sheath is in intimate contact with gas in the gas flow path;
   the connection mechanism is located at a first end of the quick connect fluid connector, and the temperature sensor is located adjacent to a second end of the quick connect fluid connector opposite the first end.

2. The quick connect fluid connector of claim 1, wherein the gas flow path includes a dead end portion, and the temperature sensor is located at the dead end portion.

3. A quick connect fluid connector that is detachably connectable to a fluid system to process a gas into or from the fluid system through the quick connect fluid connector, comprising:
   a connection mechanism having a connected position to detachably connect the quick connect fluid connector to the fluid system and a disconnected position to disconnect the quick connect fluid connector from the fluid system;
   an actuator connected to the connection mechanism to actuate the connection mechanism between the disconnected position and the connected position;
   a gas flow path through the quick connect fluid connector for gas to flow through while the gas is processed into or from the fluid system; and
   a temperature sensor disposed in the gas flow path;
   the temperature sensor includes a temperature sensing element and a sheath that separates the temperature sensing element from the gas in the gas flow path, wherein during use of the quick connect fluid connector when connected to the fluid system and processing gas into or from the fluid system, the sheath is in intimate contact with gas in the gas flow path; and
   the temperature sensor further includes a heat transfer compound between the temperature sensing element and the sheath.

4. The quick connect fluid connector of claim 3, wherein the connection mechanism is located at a first end of the quick connect fluid connector, and the temperature sensor is located adjacent to the connection mechanism.

5. A quick connect fluid connector that is detachably connectable to a fluid system to process a gas into or from the fluid system through the quick connect fluid connector, comprising:
   a connection mechanism having a connected position to detachably connect the quick connect fluid connector to the fluid system and a disconnected position to disconnect the quick connect fluid connector from the fluid system;
   an actuator connected to the connection mechanism to actuate the connection mechanism between the disconnected position and the connected position;
   a gas flow path through the quick connect fluid connector for gas to flow through while the gas is processed into or from the fluid system; and
   a temperature sensor disposed in the gas flow path;
   the temperature sensor includes a temperature sensing element and a sheath that separates the temperature sensing element from the gas in the gas flow path, wherein during use of the quick connect fluid connector when connected to the fluid system and processing gas into or from the fluid system, the sheath is in intimate contact with gas in the gas flow path;
   a second temperature sensor disposed in the gas flow path; and
   the second temperature sensor includes a second temperature sensing element and a second sheath that separates the second temperature sensing element from the gas in the gas flow path, wherein during use of the quick connect fluid connector when connected to the fluid system and processing gas into or from the fluid system, the second sheath is in intimate contact with gas in the gas flow path.

6. A quick connect fluid connector that is detachably connectable to a fluid system to process a gas into or from the fluid system through the quick connect fluid connector, comprising:
   a connection mechanism having a connected position to detachably connect the quick connect fluid connector to the fluid system and a disconnected position to disconnect the quick connect fluid connector from the fluid system;
   an actuator connected to the connection mechanism to actuate the connection mechanism between the disconnected position and the connected position;
   a gas flow path through the quick connect fluid connector for gas to flow through while the gas is processed into or from the fluid system; and
   a temperature sensor disposed in the gas flow path;
   the temperature sensor includes a temperature sensing element and a sheath that separates the temperature sensing element from the gas in the gas flow path, wherein during use of the quick connect fluid connector when connected to the fluid system and processing gas into or from the fluid system, the sheath is in intimate contact with gas in the gas flow path; and
   a piston that defines a first portion of the gas flow path, a body that surrounds the piston, and a nipple connected to the body that defines a second portion of the gas flow path; the first portion is substantially perpendicular to the second portion; and the temperature sensor is positioned closer to the second portion than to the first portion.

7. The quick connect fluid connector of claim 6, wherein the sheath is separate from the body or integrally formed with the body.

8. A method of processing a gas into or from a fluid system through a quick connect fluid connector, comprising:
    connecting the quick connect fluid connector to the fluid system to process the gas into or from the fluid system through a gas flow path of the quick connect fluid connector; and
    while the gas is being processed into or from the fluid system through the quick connect fluid connector, sensing a temperature of the gas using a temperature sensor in the gas flow path, the temperature sensor including a temperature sensing element and a sheath that separates the temperature sensing element from the gas in the gas flow path wherein the sheath is in intimate contact with gas in the gas flow path.

9. The method of claim 8, comprising sensing the temperature of the gas at a dead end portion of the gas flow path.

10. The method of claim 8, comprising sensing the temperature of the gas at a location of the gas flow path where adiabatic compression of the gas occurs.

11. The method of claim 8, further comprising:
    while the gas is being processed into or from the fluid system through the quick connect fluid connector, sensing a temperature of the gas using a second temperature sensor in the gas flow path, the second temperature sensor including a second temperature sensing element and a second sheath that separates the second temperature sensing element from the gas in the gas flow path wherein the second sheath is in intimate contact with gas in the gas flow path.

* * * * *